April 24, 1928.
L. HANKEN
1,667,700
POT SEINE
Filed Feb. 23, 1927
2 Sheets-Sheet 1
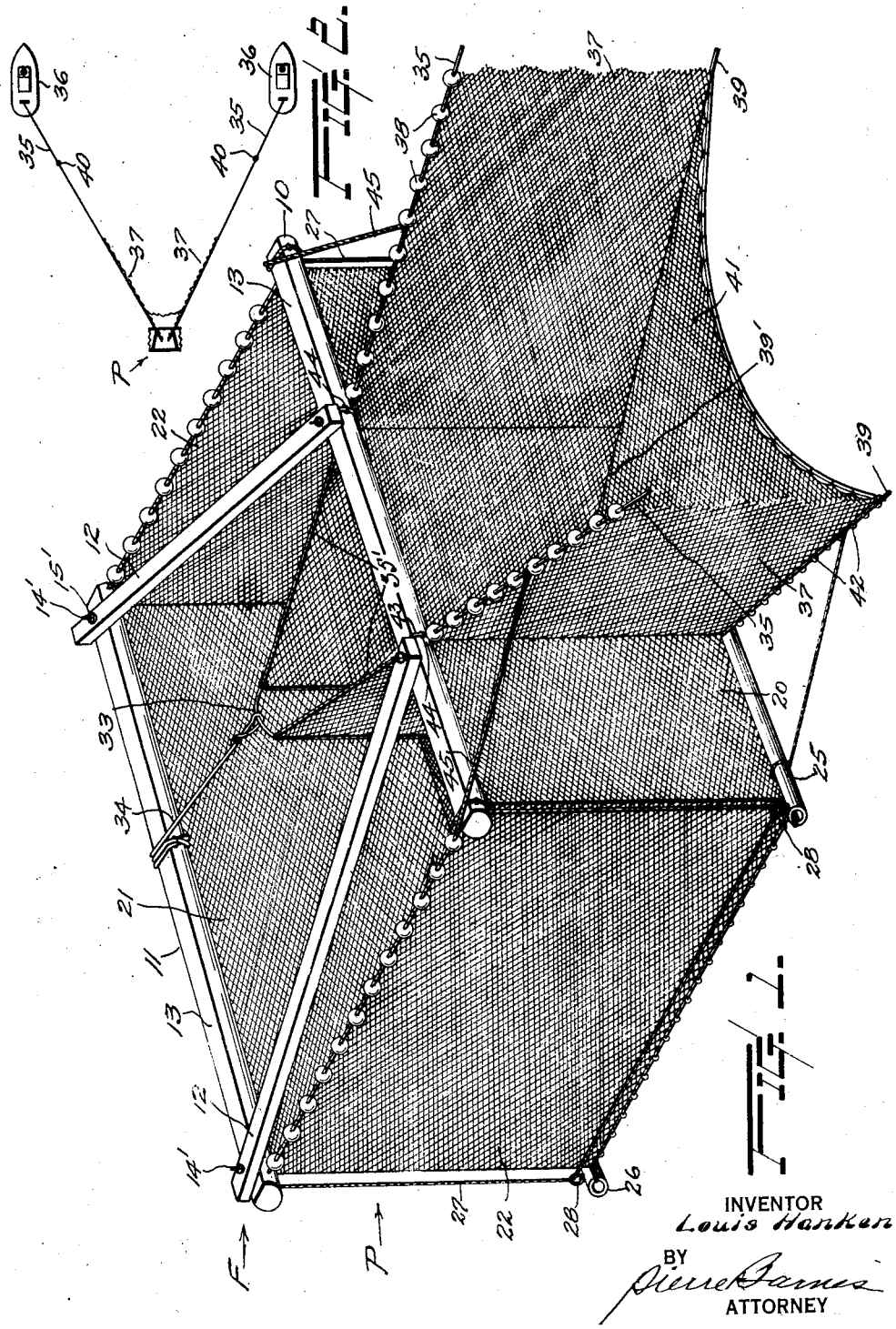
INVENTOR
Louis Hanken
BY
Pierre James
ATTORNEY April 24, 1928.  L. HANKEN  1,667,700
POT SEINE
Filed Feb. 23, 1927  2 Sheets-Sheet 2
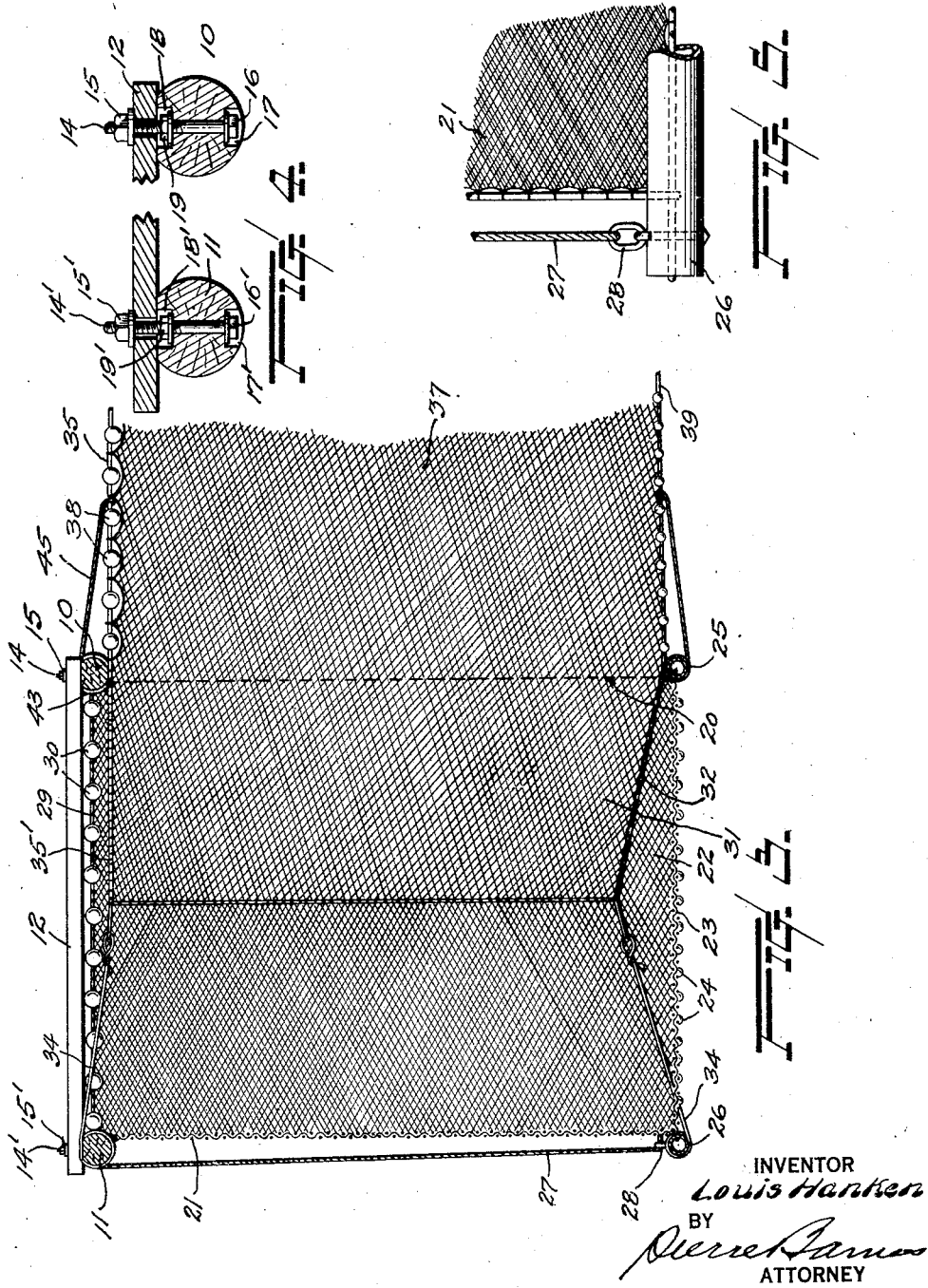

Patented Apr. 24, 1928.

1,667,700

UNITED STATES PATENT OFFICE.

LOUIS HANKEN, OF SEATTLE, WASHINGTON.

POT SEINE.

Application filed February 23, 1927. Serial No. 170,150.

This invention relates to a combined seine and fish-pot.

The primary object of the invention is the provision of fishing apparatus of this character which is adapted to catch fish while being towed by means of power boats.

Another object of the invention is to provide a device of this character which is peculiarly adapted to be employed in fishing rivers, bays, straits, etc. Another object is to provide fishing apparatus of this character which is constructed and arranged so as to be readily stowed upon the deck of a boat for transporting to and from the fishing place.

More specific objects and advantages of the invention will appear in the following description.

The invention consists of fishing apparatus having a fish-pot including a pot netting suspended from a collapsible floatative frame; a seine comprising two walls of netting extending in diverging directions from the fish-pot; and hauling cables connected to the pot frame and supporting the seine walls so that in the forward travel of the apparatus fish will be collected by the seine and thence guided by the latter into the pot.

The invention further consists in the novel construction, adaptation and combination of parts hereinafter described and claimed.

In the accompanying drawings,—

Figure 1 is a perspective view of apparatus embodying the present invention, parts of the seine leads being broken away. Fig. 2 is a plan view, shown somewhat diagrammatically, illustrating the manner of using the invention. Fig. 3 is a longitudinal vertical section taken through the pot and including a portion of the seine. Fig. 4 is a fragmentary longitudinal section of the pot frame. Fig. 5 is a fragmentary rear-end elevation of the pot.

In carrying out the invention I provide a pot, indicated generally by the letter P, having walls of netting which depend from a collapsible buoyant frame F.

Said frame is of a truss construction comprising two transversely arranged timbers, or logs, 10 and 11 held in parallel relation with each other by means of timber braces 12 disposed in inclined relation with respect to said logs so as to produce a rigid frame.

As shown the said logs are formed with plane upper surfaces 13 upon which the braces 12 seat. The braces are connected to the logs by means of headed screw bolts 14 and $14^1$, extending vertically through both the logs and braces, and nuts 15 and $15^1$ engaging the screw threads of the respective bolts.

To prevent the bolt heads from fouling with the netting, the bolt heads 16, $16^1$ (Fig. 4) are housed in recesses 17, $17^1$ provided in the undersides of the respective logs.

The bolts are, moreover, secured against accidental withdrawal from the logs by providing recesses 18, $18^1$ in the upper sides of the logs to receive nuts 19 and $19^1$ which are screwed down upon the bolt threads and against the bottoms of the respective recesses, to be entirely below the log surfaces 13 upon which the braces 12 are seated. By such an arrangement, the bolts provide stud portions which protrude above the logs to engage in holes provided therefor in the respective braces 12.

When collapsing the frame, the nuts $15^1$ are retracted a short distance and the nuts 15 withdrawn from the bolts 14, after which the braces are disconnected from the bolts 14 and thereupon are swung about the bolts $14^1$ as pivots to arrange the braces parallel with the log 11 and over the same, permitting the members of the frame to be loaded upon the deck of a boat.

The pot netting is of a substantially rectangular shape, having front and back walls 20 and 21 which are secured along their top edges to the logs 10 and 11 respectively, side walls 22 extending between said front and back logs, and a floor 23 which is bounded by the vertical walls.

The side walls 22 are desirably provided at their lower edges with sinkers 24; the front and back walls having their lower edges connected to metal bars or pipes 25 and 26, respectively.

At each side of the pot is a cable 27 which passes through eye-attachments 28 of the pipes 25 and 26 and thence extends upwardly to have the cable ends secured to the frame logs 10 and 11. Raising the pot-netting is accomplished from either of the frame logs by simultaneously pulling upwardly the portions of the cables which are connected thereto, afterwards belaying the slack portions of the cables about the ends of the log. The top edge of each side wall 22 is desirably reinforced by a rope 29 carrying cork or other floatative bodies 30. At or about its midwidth, the front netting wall 20 of the pot is provided with an opening through which projects into the central portion of the pot, a tunnel of netting having relatively converging side walls 31 and a floor 32.

At its exit end, the side walls 31 of the tunnel are held in spaced apart relation by rods 33 (Fig. 1) and which rods are made fast to guy ropes 34 extending from the frame log 11 and pipe 26, respectively.

Connected to the pot frame are cables 35 which extend forwardly to be secured to power boats 36 (Fig. 2) whereby the pot is towed together with the seine leads 37 which depend from the respective cables 35. For supporting the seine leads 37, the cables 35 above the same are provided with a plurality of cork or other floatative bodies, which are indicated by 38 in Figs. 1 and 3. The lower edges of the lead nettings are secured to cables 39 which have their forward ends secured as at 40 (Fig. 2) to the towing cables 35, and their rear ends extend as at 39¹ into the pot and constitute the corner connections between the tunnel floor and the side walls.

The towing cables 35, in like manner, are advantageously extended into the pot as at 35¹ to provide top supporting elements of the respective side walls of the tunnel. 41 represents a floor of netting connecting the seine leads and may be made as an extension of the tunnel floor, that is to say, integral therewith.

This netting of the floor 41 and the seine leads 37 are held down by means of sinkers 42 applied to the cables 39 as shown in Figs. 1 and 3.

The tow cables 35 are secured most advantageously to the pot frame by passing the cables as coils 43 about the frame log member 10 and driving staples 44 over the cables into the log. Additional securing means for the pot frame is provided by branch cables 45 extending from the ends of log 10 to the cables 35, thus distributing the stresses due to towing throughout the entire width of the pot.

In operation, the power boats are connected to the cables 35 to retain the latter and the associated seine leads in approximately the positions in which they are represented in Fig. 2, so that fish gathered in the space between the seine lead will be directed into the pot to be impounded therein. The fish may be removed from the pot by brailing or by raising the pot netting. When not in use and for convenience in transporting the trap the same may be carried in its collapsed condition upon one of the power boats. The manner of construction and operating the invention will be understood from the foregoing description.

What I claim, is,—

1. In fishing apparatus of the character described, a pot comprising netting supported by a collapsible buoyant frame, said frame consisting of two transverse members held in parallel spaced apart relation by brace members extending from the central portion of the forward of said members to within close proximity with the ends of the other of said members, towing cables secured to the central portions of said forward member and by branch cables with the outer ends of the same, seine leads depending from the respective towing cables and extending into the pot to constitute side walls of a tunnel, and floor netting connecting the lower edges of the seine leads both inside and outside of the pot.

2. In fishing apparatus of the character described, a pot comprising netting supported by a collapsible buoyant frame, said frame consisting of two transverse members held in parallel spaced apart relation by brace members extending from the central portion of the forward of said members to within close proximity with the ends of the other of said members, towing cables secured to said forward member, seine leads depending from the respective towing cables and extending into the pot to constitute side walls of a tunnel, and floor netting connecting the lower edges of the seine leads both inside and outside of the pot.

3. In fishing apparatus of the character described, a floatative pot frame comprising two timbers disposed in substantially parallel relation transversely of the pot, two timbers disposed longitudinally of the pot and in inclined relation with respect to each other and to the transverse timbers, said transverse timbers being provided with flat seating surfaces for the longitudinal timbers, screw threaded bolts rigidly secured to the transverse timbers and engageable with the longitudinal timbers, and nuts cooperating with said bolts for detachably securing the longitudinal timbers to the transverse timbers, and also serving to pivotally connect the longitudinal timbers to one of the transverse timbers.

Signed at Seattle, Washington, this 4th day of January, 1927.

LOUIS HANKEN.